United States Patent [19]
Favre-Tissot

[11] Patent Number: 5,283,413
[45] Date of Patent: Feb. 1, 1994

[54] ASSEMBLY PROCESS BY WELDING OF TWO SOLID COPPER PIECES AND ASSEMBLY PERFORMED USING SUCH A PROCESS

[75] Inventor: Jean-Paul Favre-Tissot, Brignoud, France

[73] Assignee: Merlin Gerin, France

[21] Appl. No.: 883,210

[22] Filed: May 14, 1992

[30] Foreign Application Priority Data

May 21, 1991 [FR] France ................ 91 06306

[51] Int. Cl.⁵ .............................. B23K 11/18
[52] U.S. Cl. ........................ 219/93; 219/118
[58] Field of Search .......... 219/93, 117.1, 118

[56] References Cited

U.S. PATENT DOCUMENTS

| | | | |
|---|---|---|---|
| 1,020,056 | 3/1912 | Rietzel | 219/93 |
| 1,733,922 | 10/1929 | Trageser et al. | 219/118 |
| 4,583,065 | 4/1986 | Favre-Tissot. | |
| 4,591,687 | 5/1986 | Urech | 219/93 |

FOREIGN PATENT DOCUMENTS 0148051 7/1985 European Pat. Off. .

OTHER PUBLICATIONS

"Metals Handbook", vol. 6, Edition 9, Dec. 1983, pp. 503-524, American Society for Metals.
"Metals Handbook", vol. 6, Edition 9, Dec. 1983, pp. 548-556, American Society for Metals.
Welding & Metal Fabrications, vol. 55, No. 7, Oct. 1987, pp. 365-366, 368.

*Primary Examiner*—Geoffrey S. Evans
*Attorney, Agent, or Firm*—Parkhurst, Wendel & Rossi

[57] ABSTRACT

Two solid copper pieces are assembled by welding without filler metal. The pieces both have a projection which are placed facing and in contact with one another, before the pieces to be assembled are placed on the welding press. Welding is performed by passing a very high intensity current for a short period of about one tenth of a second under very high pressure. The welding operation prevents any annealing of the copper.

7 Claims, 2 Drawing Sheets

ASSEMBLY PROCESS BY WELDING OF TWO SOLID COPPER PIECES AND ASSEMBLY PERFORMED USING SUCH A PROCESS

BACKGROUND OF THE INVENTION

The invention relates to an assembly process by welding of first and second solid copper pieces without filler metal.

In electrical switchgear a large number of solid pieces are made of copper, whose good electrical conduction is well known. All the assemblies of these solid copper pieces require hot joining by brazing. The filler metal is generally a silver-based alloy whose fusion point is lower than that of copper and the operation is a delicate one. The copper is necessarily heated and it undergoes a physical annealing transformation, and an external degradation due to the carbon deposits from brazing. The pieces then have to be cleaned and treated chemically to recover their original appearance. The copper recovers part of its hardness with time.

SUMMARY OF THE INVENTION

The object of the present invention is to achieve assemblies of solid copper pieces by means of a simple process, not using any filler metal.

The assembly process according to the invention is characterized in that it comprises the following steps:

shaping the first piece to form on its front face a projection and on its rear face a conjugate cavity of smaller cross section than that of the projection and an indentation in the shape of a ring of limited depth surrounding the cavity, shaping of the second piece to form a projection at an assembly point to the first piece, placing the first piece on a resistance welding press having first and second copper-based electrodes, said front face facing the second electrode, and the rear face being applied against the first electrode whose cross section is greater than that of the indentation and bears on the circumference of the indentation, placing the second piece on the second electrode of the welding press, the two projections being arranged in the axis of the press and brought into point contact, heating the two pieces by passing electrical current between the first and second electrodes so that the current passes through the first piece, via the two projections in contact with each other and the second piece, compressing of the two pieces by applying a pressure by the first and/or second electrode to flatten the two projections and cause welding.

The process is performed on a resistance welding press, heating of the pieces being localized in the zone of the projections. The low electrical resistance of copper makes it particularly difficult to heat by passing current and therethrough. According to the invention, this difficulty is overcome by a concentration of the current flow in a limited zone, i.e. the contact point between the two projections. The heating is thus localized in the zone of the projections and causes fusion of the latter, which are deformed and flattened by the pressure of the welding press to bring the two pieces into contact. Welding of the two pieces is thus achieved without any filler metal and without the risk of annealing or tarnishing of the copper. The intensity of the welding current and the welding pressure and current application time naturally depend on the shapes and sizes of the pieces to be assembled. For example, an assembly can be achieved between two copper current carrying bars by passing a current of about 100,000 amperes for a very short time, for example about one tenth of a second. The pieces are subjected during the welding operation to a pressure of several hundred decanewtons. The very short current passage time limits the heat dispersion and heat rise of a notable part of the piece.

The second difficulty to be overcome is the heat rise of the electrodes of the press and of the contact zone between the electrodes and the piece. According to the invention, the electrodes are copper-based, in particular cuprochrome, and therefore have a low electrical resistance and reduced heat rise. The heat rise in the contact zone is mastered by providing an annular contact surface due to the ring-shaped indentation which is arranged, according to the invention, around the cavity of the rear face of the piece. The contact pressure is thus distributed uniformly over an annular zone avoiding point contacts, which cause heat rise and local welding. The diameter of the indentation is for example about half the diameter of the electrode and its depth is a few tenths of a millimeter.

The projection is advantageously in the form of a spherical cap with a height of a few millimeters, and in the case of a piece in the form of a bar or plate, it is advantageously achieved by a stamping operation which results in a conjugate cavity on the opposite face. The two pieces or plates to be assembled are placed on one another and that their projections face each other and are in contact before being inserted between the electrodes of the press. The electrodes are then applied to the pieces with insufficient pressure to notably deform the projections. This deformation does however take place during the current passage which causes a heat rise by resistance of the projections and local fusion of the copper. The welding process according to the invention is particularly well-suited for assembling bars or plates which may have thicknesses of several centimeters, but it is applicable to pieces of different shapes, notably revolution pieces whose end has to be assembled to another piece, itself in the form of a rod or in the form of a plate. The projection is then achieved in any suitable manner, for example by simple machining, and the electrodes of the welding press are adapted to the shape of this piece by being arranged as a clamp having jaws for clamping the piece for example. In this case, the clamping force of the piece by the jaws is chosen to be sufficiently large to prevent any point contact. This force is not exerted in the direction of the projections and the risk of premature flattening of these projections is therefore avoided.

The invention also relates to the welding press, enabling the above process to be performed, and also to an assembly achieved by means of this process.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 1:
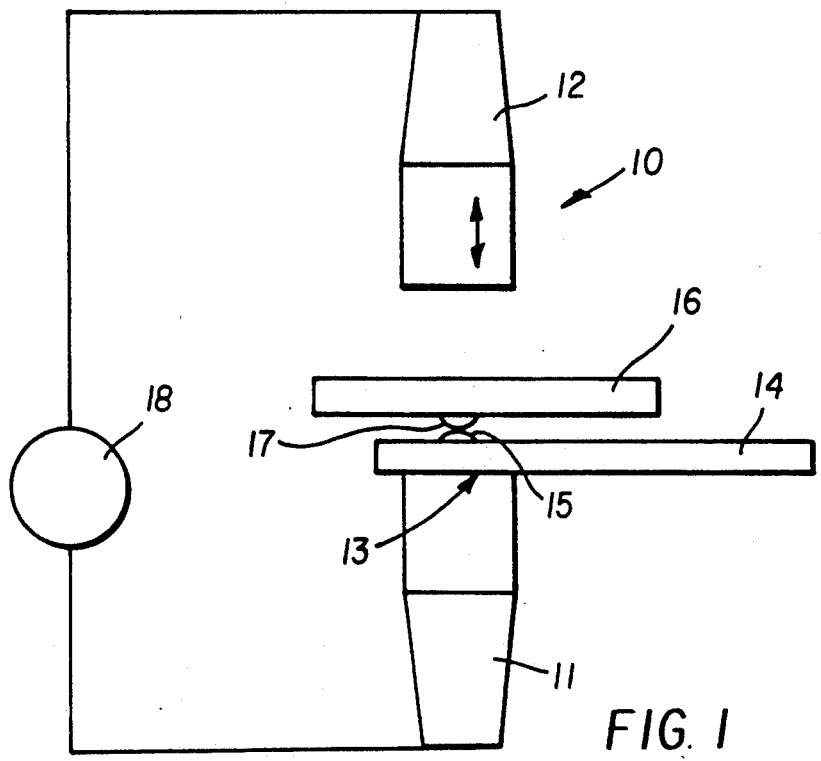
FIG. 1 is a schematic view of a welding press, the two pieces to be assembled being inserted between the two electrodes before the welding operation.

In the drawings a welding press 10 comprises a fixed lower electrode 11 and a movable upper electrode 12, which can be moved into contact with the lower electrode 11 by a mechanism which is not shown. On the face 13 of the lower electrode 11 there is placed a second piece 14 in the form of a bar, whose face opposite the one placed on the electrode 11 bears a projection 15. A first piece to be assembled 16 is placed on the second piece 14 and it also presents a projection 17 which is pressed into contact with the projection 15 of the opposite piece. The first piece 16 is also in the form of a bar or plate and the only electrical contact between the two pieces 14,16 is at the level of the projections 15,17. The electrodes 11,12 are connected to a high intensity current source 18 and the welding operation is performed by closing of the electrodes 11,12 and application of a strong pressure, for example several hundred decanewtons. As soon as the press is closed, a high intensity current is passed between the electrodes 11,12 and pieces 14,16 maintaining the pressure and it can easily be seen that the current necessarily passes via the contact zone between the projections 15,17 with a concentration in this zone which gives rise to local heating and fusion of the metal forming the projections. The duration is extremely short, for example a few tenths of a second, which prevents any overheating of the pieces 14,16. As an example, it can be stated that two current input strips in the form of bars can be assembled by providing a current flow of 90,000 Amperes for a tenth of a second under a clamping pressure of the pieces of 750 decanewtons. These values naturally depend on the shape and thickness of the pieces 14,16.

Figure 2:
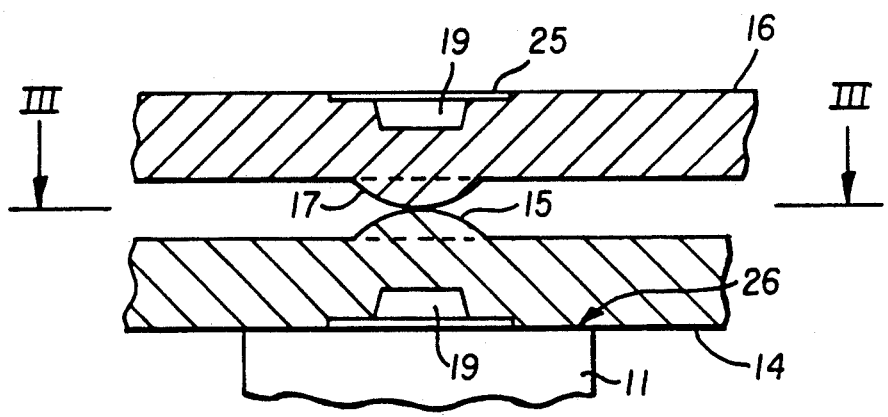
FIG. 2 is a cross-section on an enlarged scale of the two pieces according to FIG. 1.
Figure 3:
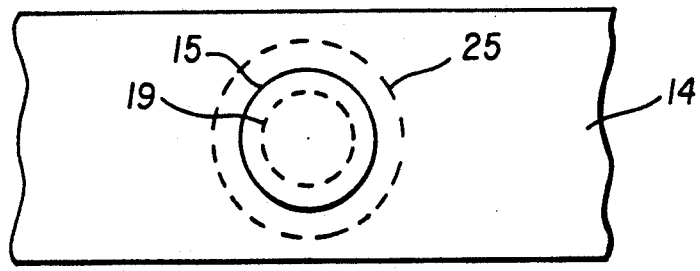
FIG. 3 is a view according to the line 3—3 of FIG. 2.

The projections can be achieved by any suitable means, one of these means being simple stamping of a piece in the form of a bar or plate, which stamping results on the face opposite the projection in a conjugate cavity 19 of a smaller cross section than that of the projection 15,17. FIGS. 2 and 3 represent projections 15,17 in the shape of a spherical cap made by stamping, but it is clear that the shape of the projections 15,17 can be different, the only obligation being an almost pinpoint contact zone. Around each cavity 19 there is arranged an indentation 25 in the form of a ring of small depth, so that the electrode 11,12, whose cross section is greater than that of the indentation 25, bears on the circumference 26 of the indentation 25 over a reduced distributed surface. The diameter of the indentation 25 is greater than that of the projection 15,17 and for example about half that of the electrode 11,12. The depth of the indentation 25 is small, for example a few tenths of a millimeter.

Figure 4:
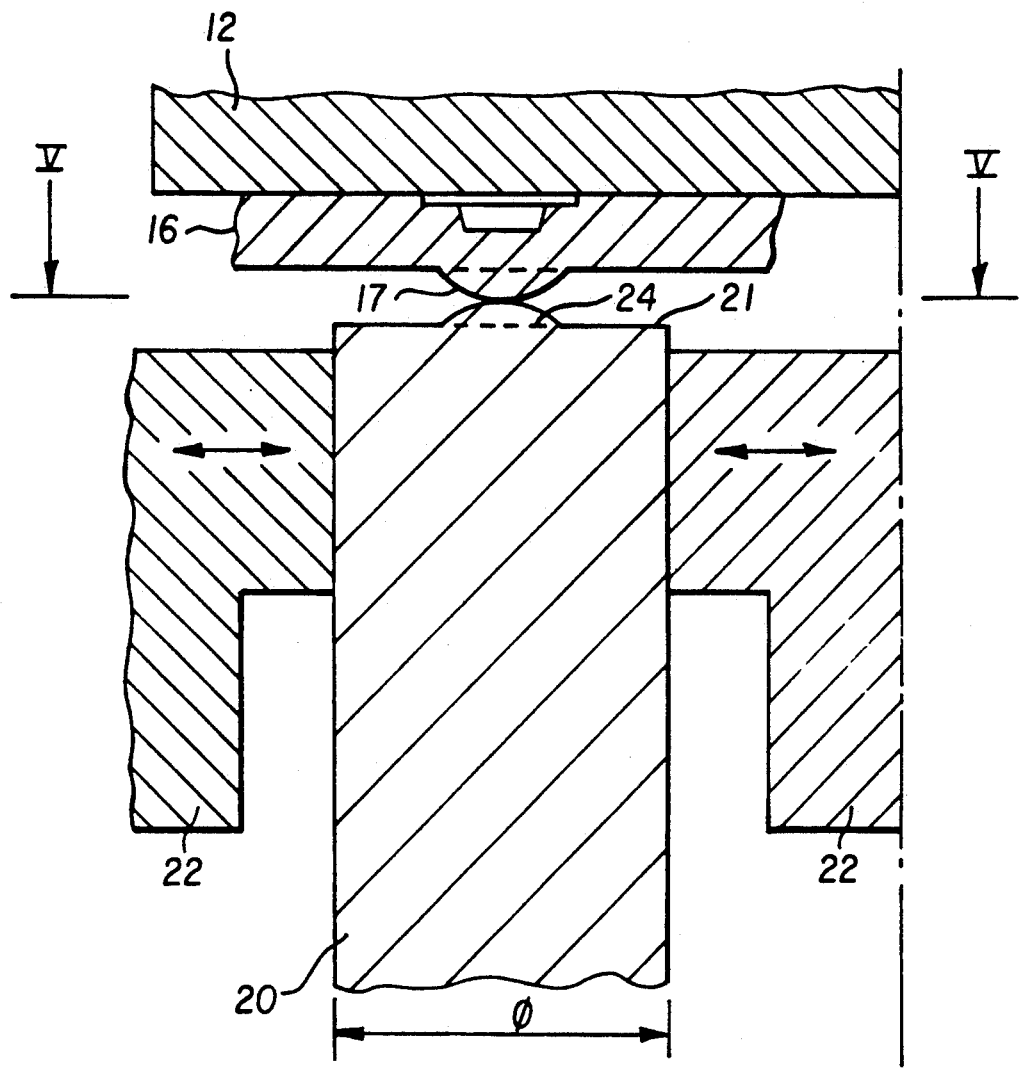
FIG. 4 is a similar view to that of FIG. 1 illustrating an alternative embodiment.
Figure 5:
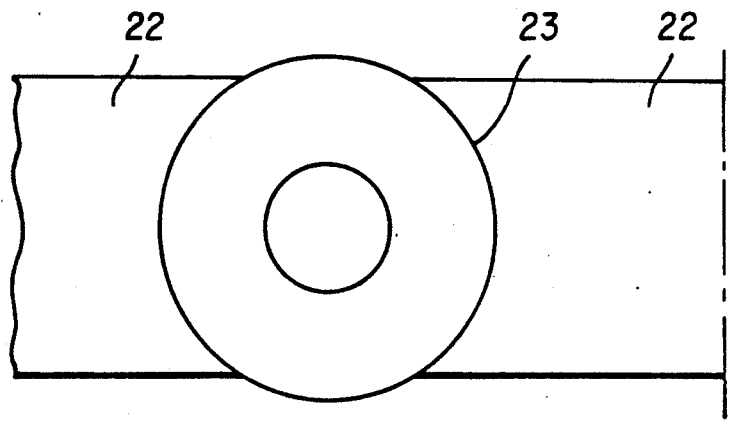
FIG. 5 is a view according to the line 5—5 of FIG. 4.

FIGS. 4 and 5 illustrate an alternative embodiment enabling assembly of a revolution piece 20 by its end 21 with a bar 16. The length of the piece 20 prevents it from being inserted between the two electrodes 11,12 of a standard press, and according to the invention the lower electrode is arranged as a clamp having jaws 22 whose grips 23 are shaped to follow the revolution surface of the piece 20. The end face 21 of the revolution piece 20 has a projection 24 against which the projection 17 of the piece 16 presses. The welding operation is performed in the manner described above and enables the bar 16 to be secured to the end of the revolution piece 20. Assembly of pieces of different shapes is naturally possible, the only obligation being a good electrical and mechanical contact between the pieces and electrodes to prevent the pieces from being welded onto the electrodes.

The invention is naturally applicable to copper-based pieces, notably copper alloys, and the optimum welding parameters can easily be selected by a crystallographic study of the weld. The local heating of very short duration prevents annealing of the copper which preserves all its mechanical properties, and the absence of filler metal prevents any carbon deposits or other impurities which might affect the qualities of electrical contact with other pieces.

I claim:

1. A process for welding first and second solid copper pieces together without a filler metal, said first piece having front and rear opposite major surfaces, comprising the steps of:

providing a first projection to extend from said rear surface of said first piece and a first cavity opposite said first projection, said first cavity extending into said front surface of said first piece, said first cavity having a smaller cross-sectional width than that of said first projection;

providing a first annular groove in said front surface of said first piece to surround said first cavity, said first annular groove having a depth less than that of said first cavity;

providing a second projection to extend from a surface of said second piece;

arranging said first and second pieces such that said first and second projections are in contact with each other;

applying a first electrode to said first piece upon said front surface, said first electrode having a contact surface larger than said annular groove such that said contact surface extends beyond said annular groove and contacts a portion of said front surface surrounding said annular groove;

applying a second electrode to said second piece, said first and second electrodes being copper-based;

passing an electrical current between said first and second electrodes through said first and second pieces and said first and second projections to heat said first and second projections; and applying a compression force to the first and second pieces to press said first and second pieces toward each other.

2. The process of claim 1, wherein said first and second projections are semi-spherical to enable point contact therebetween.

3. The process of claim 1, wherein said electrical current is applied for about a tenth of a second, said electrical current is about 100,000 amperes and said compression force is applied at a pressure of a few hundred decanewtons.

4. The process of claim 1, wherein said second piece comprises front and rear opposite major surfaces, said second projection extending from said front surface of said second piece, wherein a second cavity and a second annular groove surrounding said second cavity are formed in said rear surface of said second piece, said second cavity having a smaller cross-sectional width than that of said second projection, said second annular groove having a depth less than that of said second cavity, and wherein said second electrode has a contacting surface larger than said second annular groove such that said second electrode extends beyond said annular groove and contacts a portion of said rear surface of said second piece which surrounds said second annular groove.

5. The process of claim 1, wherein said first piece is plate-shaped.

6. The process of claim 1, wherein said second electrode is a clamp which radially grips the second piece so as to fixedly secure the clamp to the second piece.

7. The process of claim 6, wherein said second piece is cylindrical.

* * * * *